(12) United States Patent
Scrivano et al.

(10) Patent No.: US 12,105,733 B2
(45) Date of Patent: Oct. 1, 2024

(54) CHUNK AWARE IMAGE LOCALITY SCORES FOR CONTAINER IMAGES IN MULTI-NODE CLUSTERS

(71) Applicant: Red Hat, Inc., Raleigh, NC (US)

(72) Inventors: Giuseppe Scrivano, Milan (IT); Mrunal Patel, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 43 days.

(21) Appl. No.: 18/049,548

(22) Filed: Oct. 25, 2022

(65) Prior Publication Data
US 2024/0134878 A1   Apr. 25, 2024
US 2024/0232220 A9   Jul. 11, 2024

(51) Int. Cl.
*G06F 16/27* (2019.01)
*G06F 9/455* (2018.01)
*G06F 9/48* (2006.01)

(52) U.S. Cl.
CPC .......... *G06F 16/27* (2019.01); *G06F 9/45558* (2013.01); *G06F 9/4881* (2013.01); *G06F 2009/45583* (2013.01)

(58) Field of Classification Search
None
See application file for complete search history.

(56) References Cited

U.S. PATENT DOCUMENTS 9,354,907 B1 *  5/2016  Teli ..................... G06F 9/45558
11,262,953 B2   3/2022  Corrie et al.
2015/0058555 A1 * 2/2015  Karamanolis ......... G06F 3/0605
                                                  711/114
2015/0074672 A1 * 3/2015  Yeddanapudi .......... G06F 9/455
                                                  718/103
(Continued)

FOREIGN PATENT DOCUMENTS

CN    111459611 A    7/2020
CN    111708656 A    9/2020
(Continued)

OTHER PUBLICATIONS

Giuseppe Scrivano et al., "Pull container images faster with partial pulls", Red Hat, Inc., Nov. 12, 2021.
(Continued)

*Primary Examiner* — Eddy Cheung
(74) *Attorney, Agent, or Firm* — Womble Bond Dickinson (US) LLP (57) ABSTRACT

Methods, systems, and techniques are disclosed for managing replication in a deployable object, such as a pod (e.g., a group of one or more containers). For example, when a pod is started in a cluster, the deployable object may start one or more virtual computer systems (e.g., containers), which may pull (e.g., initiate and run) container images from a registry server. The processing device may thus identify, such as on the file level, which container image should be pulled first. A scheduler of the one or more virtual computer systems may prioritize, based on the computed scores, a subsequent replication of archived data of the one or more virtual computer systems to be performed. The processing device may then execute, based on the prioritization by the scheduler, the subsequent replication of the archived data of the one or more virtual computer systems in the deployable object.

20 Claims, 6 Drawing Sheets

(56) References Cited

U.S. PATENT DOCUMENTS

| | | | |
|---|---|---|---|
| 2020/0028935 A1* | 1/2020 | Sahay | G06F 9/5088 |
| 2020/0034167 A1* | 1/2020 | Parthasarathy | G06F 9/45558 |
| 2021/0049002 A1* | 2/2021 | Myers | G06F 8/656 |
| 2021/0226929 A1* | 7/2021 | Kiyanclar | H04L 63/20 |
| 2021/0365290 A1 | 11/2021 | Zhang et al. | |
| 2023/0073371 A1* | 3/2023 | Butt | G06F 3/0659 |

FOREIGN PATENT DOCUMENTS

| | | |
|---|---|---|
| CN | 113867919 A | 12/2021 |
| CN | 113946429 A | 1/2022 |

OTHER PUBLICATIONS

Kohei Tokunaga, "Speeding Up Pulling Container Images on a Variety of Tools with eStargz", Medium.com, NTTLabs, May 12, 2021.

* cited by examiner

CHUNK AWARE IMAGE LOCALITY SCORES FOR CONTAINER IMAGES IN MULTI-NODE CLUSTERS

TECHNICAL FIELD

Aspects of the present disclosure relate to container image management.

BACKGROUND

A container may be an isolated execution environment in which one or more processes may be executed. A container may include isolated computing resources to act as a sandbox computing environment. A container image may include the allocated resources and necessary file systems for a container instance to be instantiated. A container registry may store several different container images that may be retrieved and instantiated at a host computing system. Such retrieval or initiation may be resource consuming as the sizes of the container images can be substantial.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

The present disclosure provides methods, systems, and techniques for managing replication in a deployable object, such as a pod (e.g., a group of one or more containers, with shared storage and network resources, and a specification for how to run the containers). For example, when a pod is started in a cluster, the deployable object may start one or more virtual computer systems (e.g., containers), which may pull (e.g., initiate and run) container images from a registry server.

Because some containers may include at least part of some deployed or replicate image portions, to correctly prioritize replication orders and container image pulls, a processing device may compute locality scores corresponding to the images to be pulled. The locality scores have fine granularity distinctions, such as on chunk sizes or smaller, to identify a size of each image being pulled. Each locality score is indicative of a respective amount of data transfer measured based on a chunk size difference between an existing file in the one or more virtual computer systems, and a reference file of a target device to which the one or more virtual computer system replicate.

The processing device may thus identify, such as on the file level, which container image should be pulled first. A scheduler of the one or more virtual computer systems may prioritize, based on the computed scores, a subsequent replication of archived data of the one or more virtual computer systems to be performed. The processing device may then execute, based on the prioritization by the scheduler, the subsequent replication of the archived data of the one or more virtual computer systems in the deployable object.

A container image may be a collection of files and file systems to be used for allocating computing resources and to provide an isolated execution environment for one or more applications, functions, processes, etc. In some instances, the container image may be stored in a compressed format that can be retrieved and extracted to build a container instance. Often, multiple container images may include several of the same files, each of which are stored and retrieved individually for each of the container images. For example, in a container registry in which container images may be stored for later retrieval can include container images that are slightly different from one another. The files of each container image may be stored in the registry or a server to be pulled when a pod is created or deployed.

During pod creation or deployment, image pulls are usually the most expensive operation when starting up a pod in a Kubernetes cluster. Such starting cost may add up to the latency for starting up containers. Conventionally, the Kubernetes scheduler uses a heuristic to favor the scheduling of a pod on a node where most of the images are present, such that the pod needs pull less information from the registry. However, such heuristic is on an image level, lacking fine granularity, e.g., two pods having a same number of images to be pulled may be treated the same while the actual data to be pulled are different. The heuristic relies on a score computed at the image level, that is, the score does not reflect differences of files in the image. As such, the existing heuristic fails to consider or take advantage of a finer granular level distinction between image pulling tasks. The present disclosure overcomes such deficiency and enables the scheduler to favor a node that has similar images at a granularity level (e.g., at the file level or the chunk level) to the images needed by the pod.

When a container image is pulled, many redundant or duplicate files of similar container images may be transmitted even though many of the files are already present at a target client or device (e.g., a container registry, a pod, or any client devices) from previously pulled container images. Furthermore, in some instances when a host machine requests a container image to be pulled from the registry, the host machine may already have some of the files for the requested container already present at the host machine, while the entire container image may nonetheless be pulled from the registry. The above inefficiencies of conventional systems result in longer than necessary pull and pull times of container images to and from a container registry as well as large storage costs due to duplicate files stored at the registry.

The present disclosure provides methods and techniques for managing the pulling of the images to overcome such inefficiencies in two general aspects: first, image pulling avoids duplicate information in fine granularity, such as to the chunks level so that only different or additional information are pulled; second, images pulling is prioritized so that the image pull that occupies the least time resource is performed first, minimizing the overall image pulling operation time period. Details of implementing these general aspects along with other specific aspects are discussed below.

Aspects of the present disclosure address the above-noted and other deficiencies by computing a locality score on a granular level, such as to the chunk size level. In some examples, computing the locality score may include computing, at each node of a cluster, a locality score based on a chunk size corresponding to missing information in the target client device. The node of the cluster may receive a list of chunks from a scheduler of the one or more virtual computer systems. The scheduler may prioritize pulling of multiple images based on corresponding locality scores. For example, the node of the cluster may send the plurality of scores to the scheduler of the one or more virtual computer systems for prioritizing the subsequent replication, in order to minimize the time duration for the overall pod creation or deployment operation.

Figure 1:
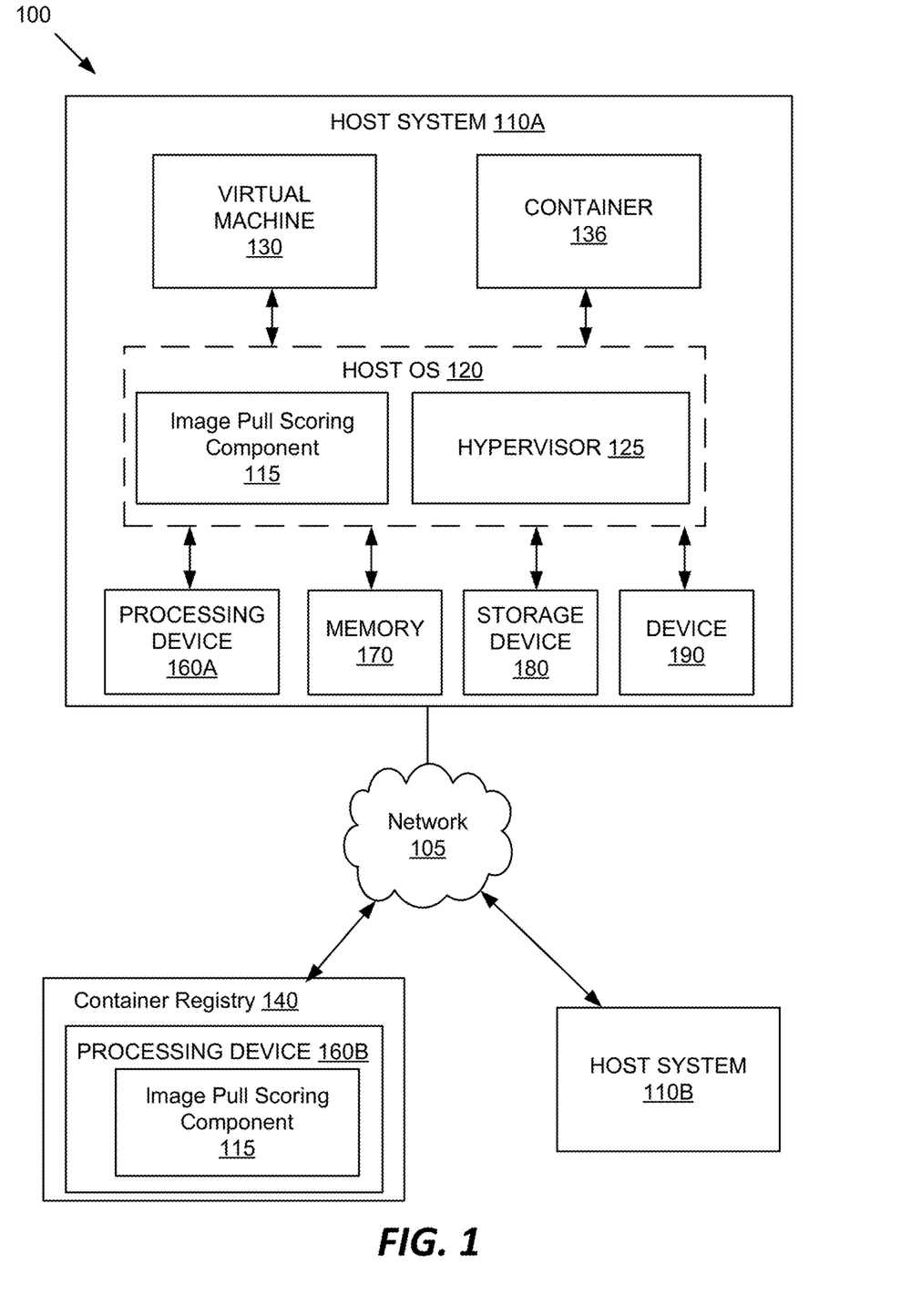
FIG. 1 is a block diagram that illustrates an example computer architecture, in accordance with some embodiments.

FIG. 1 depicts a high-level component diagram of an illustrative example of a computer system architecture 100, in accordance with one or more aspects of the present disclosure. One skilled in the art appreciates that other computer system architectures are possible, and that the implementation of a computer system utilizing examples of this disclosure is not limited to the specific architecture depicted by FIG. 1.

As shown in FIG. 1, the computer system architecture 100 includes host systems 110A-B and a container registry 140 (e.g., a server). The host systems 110A-B and container registry 140 include one or more processing devices 160A-B, a memory 170 that may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect (PCI) solid state drive, a Redundant Array of Independent Disks (RAID) system, a network attached storage (NAS) array, etc.), and one or more devices 190 (e.g., a PCI device, network interface controller (NIC), a video card, and an I/O device, etc.).

In certain implementations, the memory 170 may be non-uniform access (NUMA), such that memory access time depends on the memory location relative to processing devices 160A-B. For simplicity in this description, the host system 110A is depicted as including a single processing device 160A, storage device 180, and device 190 in FIG. 1, however, other embodiments of host systems 110A may include multiple processing devices, storage devices, and devices. Similarly, container registry 140 and host system 110B may include a plurality of processing devices, storage devices, and devices.

The host systems 110A-B and container registry 140 may each be a server, a mainframe, a workstation, a personal computer (PC), a mobile phone, a palm-sized computing device, etc. In embodiments, host systems 110A-B and container registry 140 may be separate computing devices.

In some embodiments, host systems 110A-B and/or container registry 140 may be implemented by a single computing device. For conciseness, FIG. 1 does not explicitly depict some components included in the container registry 140 and the host system 110B as commonly understood by someone having ordinary skills in the art. Furthermore, although the computer system architecture 100 is illustrated as having two host systems, embodiments of the disclosure may utilize any number of host systems.

The host system 110A may additionally include one or more virtual machines (VMs) 130, containers 136, and host operating system (OS) 120. The VM 130 is a software implementation of a machine that executes programs as though it were an actual physical machine. The container 136 acts as an isolated execution environment for different functions of applications. The VM 130 and/or the container 136 may be an instance of a serverless application or function for executing one or more applications of a serverless framework. The host OS 120 manages the hardware resources of the computer system and provides functions such as inter-process communication, scheduling, memory management, and so forth.

The host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. The hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110A-B and the container registry 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or the container registry 140. In some embodiments, host system 110A and 110B may be a part of privacy preservation platform 140. For example, the virtual machines 130 and/or containers 136 of host system 110A and 110B may be a part of a virtual network of the container registry 140.

In embodiments, processing device 160B of the container registry 140 executes an image pull scoring component 115 for computing locality scores of container image files pulled to or pulled from container registry 140. In some examples, at least a portion of image pull scoring component 115 may also be included at host system 110A (e.g., executed by host OS 120). The image pull scoring component 115 may determine what portions, if any, of files of a container image being pulled to container registry 140 are already stored at the container registry 140. For example, the image pull scoring component 115 may compute a locality score indicative an amount of granular data replication necessary to have a target image be the same as a source image. In some cases, the granularity level may be on the chunk level, such that only different or updated chunks of data of the files in the source image are pulled (e.g., as opposed to replicating the whole file having different portions) to the corresponding files in the target image, avoiding replicating existing and common chunks of data in the target image. As such, substantial resource savings can be achieved.

In some cases, if a file matches (e.g., no difference between the file in the target image and the corresponding file in the source image), then image pull scoring component 115 may indicate, such as to an image pull scheduler (e.g., the image pull scheduler 325 of FIG. 3), with a locality score that the file needs not be replicated. On the other hand, when several files are to be replicated due to data differences, the files with the least difference may be prioritized in replication such that more files of the image may be ready for use sooner than otherwise. When there are multiple images to be pulled, the locality scores may also indicate respective time required for each image pulling operation. The image pulling operation may then be prioritized accordingly (e.g., least time first). Further details regarding the image pull scoring component 115 will be discussed below.

Often, users rely on microservices and containers to build software applications. The applications may be delivered and scaled intelligently in a hybrid cloud environment on a container platform, such as OpenShift™. OpenShift™ includes a Kubernetes platform that provides a foundation for on-premises, hybrid, and multi-cloud deployments of software applications. Such container platform provides automated operations and life-cycle management of the application deployment. For example, users of a development team may build and deploy new applications on the container platform. Users of an operations team may provision, scale, and/or manage a Kubernetes platform, which includes a cluster when deployed. A Kubernetes cluster may include a set of nodes (e.g., worker machines) that run containerized applications (e.g., packaged with runtime, libraries, etc.). The nodes may host Pods while a control plane may be used to manage the nodes and the Pods in the cluster. In some cases, a control plane may run across multiple computers, while a cluster may run multiple nodes in order to provide fault-tolerance and availability. In the examples herein, methods and techniques of the present disclosure may be performed at each node or pod of the cluster.

Figure 2:
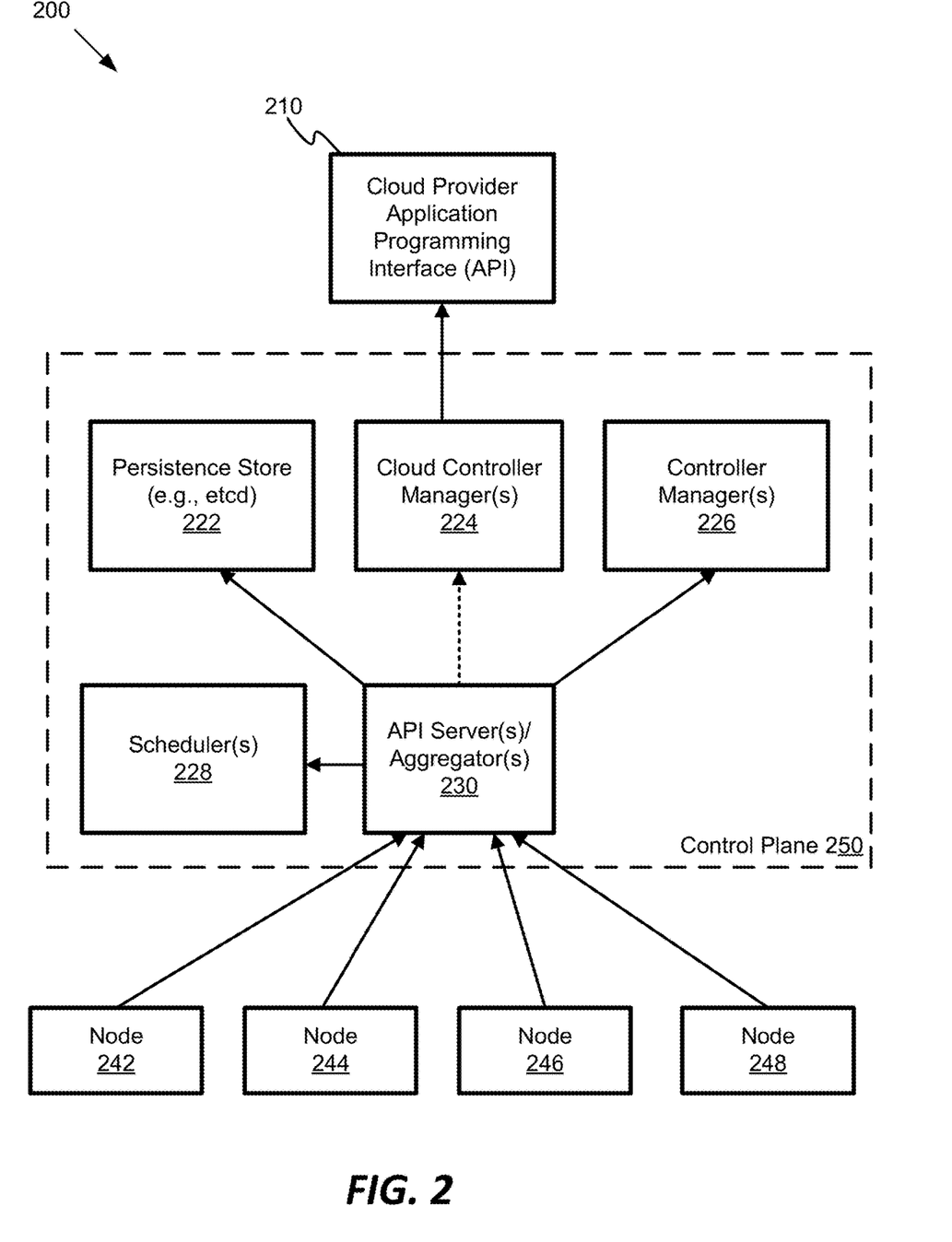
FIG. 2 is an illustration of an example high-level component diagram of a deployed cluster for container image pulling with chunks aware image locality scores, in accordance with embodiments of the disclosure.

FIG. 2 depicts a high-level component diagram of an illustrative example of a deployed cluster 200 managing multiple worker nodes 242, 244, 246, and 248, in accordance with one or more aspects of the present disclosure. The nodes 242, 244, 246, and 246 may include one or more virtual machines, such as the virtual machine 130 of FIG. 1, and/or initiate one or more Pods including one or more containers, such as the container 136 of FIG. 1.

As shown in FIG. 2, a control plane 250 interfaces between the nodes 242-248 and the cloud provider application programming interface (API) 210. The control plane 250 includes components such as a persistence store 222 (e.g., etcd), a cloud controller manager 224, a controller manager 226, a scheduler 228, and an API server or aggregator 230. The control plane components may make global decisions about the cluster 200 (e.g., scheduling) and detect or respond to cluster events (e.g., initiating a new pod when a deployment replica field is not satisfied). The control plane components may run on any machine (e.g., computational devices, not shown) in the cluster 200. In some cases, the control plane components may start on a common machine for simplicity purposes and may not run user containers on the common machine.

The API server 230 may include a kube-apiserver, which is a component of a Kubernetes control plane that exposes the Kubernetes SPI. In some cases, the API server 230 may be considered as the front end of the Kubernetes control plane when the API server 230 forwards requests from the nodes 242-248 to the other control plane components. In some cases, the API server 230 may be considered as the back end of the control plane 250, handling requests from the nodes 242-248.

The persistence store 222 may include an etcd, a consistent and highly-available key value store used as Kubernetes' backing store for cluster data. The scheduler 228 may include a kube-scheduler, which is a control plane component watching for newly created Pods with no assigned node. The scheduler 228 may control operations of image pulls as well as select a node for the Pods to run on. The image pull operations may be prioritized based on the locality scores computed at a granular data level, such as the differences between chunks in files of images to be pulled. The scheduler 228 may consider various factors for scheduling decisions, including: the locality scores computed by the image pull scoring component 115, individual and collective resource requirements, hardware/software/policy constraints, affinity and anti-affinity specifications, data locality, inter-workload interference, deadlines, among others.

The controller manager 226 may include a kube-controller-manager, which runs controller processes. The controller manager 226 may include a node controller for noticing and responding when nodes become unavailable. The controller manager 226 may include a job controller that watches for job objects that represent tasks and creates Pods to complete the tasks. The controller manager 226 may include endpoints controller for populating end point objects for joining services and/or pods. The controller manager 226 may also include service account and token controllers for creating default accounts and API access tokens for new namespaces.

The cloud controller manager 224 may be a Kubernetes control plane component that embeds cloud-specific control logic. As shown in FIG. 2, the cloud controller manager 224 may link the cluster 200 into the cloud provider's API 220. The cloud controller manager 224 may run controllers that are specific to the cloud provider. The cloud controller manager 224 may be optional and not required when the cluster 200 is running on local premises, or in a learning environment inside one machine. The controller manager 226 and the cloud controller manager 224 may respectively combine several logically independent control loops into a single binary running as a single process. Both may be scaled horizontally (e.g., run in multiple copies) to improve performance or to help tolerate failures.

The nodes 242-248 may respectively include node components that run pods and provide the Kubernetes runtime environment. For example, each of the nodes 242-248 may include an agent (e.g., kubelet) that makes sure that containers are running in a pod. An agent may take a set of PodSpecs that are provided through various mechanisms and ensures that the containers described in the PodSpecs are running and healthy. Each of the nodes 242-248 may include a network proxy (e.g., kube-proxy) to implement part of the Kubernetes service concept. For example, the network proxy may maintain network rules on the nodes 242-248. The network rules may enable network communications to Pods from network sessions inside or outside of the cluster 200. The nodes 242-248 may each include additional components, such as container runtime, addons such as DNS and web user interface (UI), etc. For example, a container runtime may be responsible for running containers. Addons may use Kubernetes resources (DaemonSet, Deployment, etc) to implement cluster features.

Figure 3:
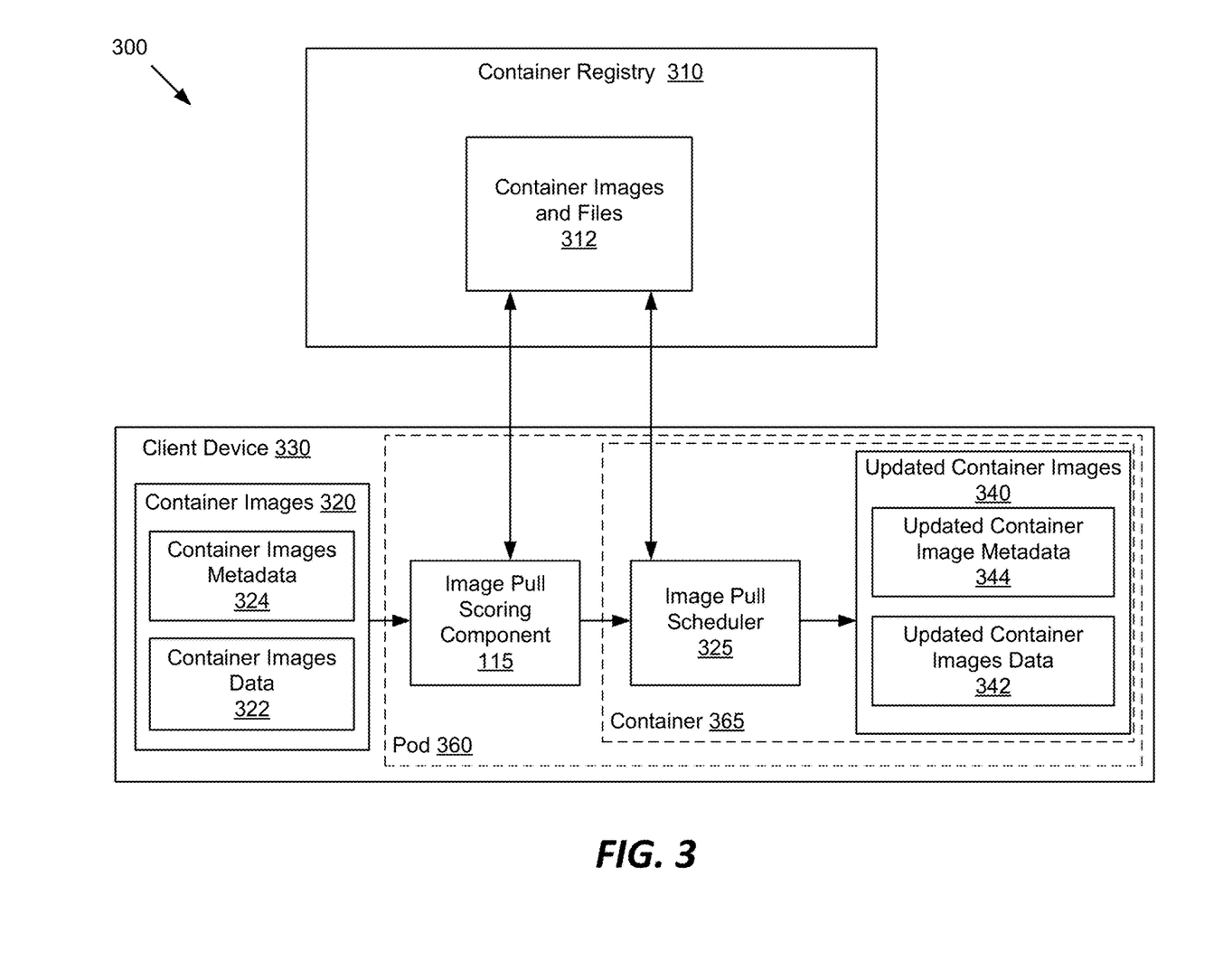
FIG. 3 depicts an example system for optimized pull of container images to a container registry, in accordance with some embodiments.

FIG. 3 is an example of a system 300 for computing locality scores of a pull of a container image, according to some embodiments. The system 300 includes a client device 330 and a container registry 310 (e.g., a registry server). In some examples, the client device 330 may include an image pull scoring component 115 for computing locality scores of a container image 320 before pulling the container image files 312 from the container registry 310. For example, the client device 330 may include one or more Pods (such as the pod 360). A pod may start one or more virtual computer systems (e.g., the container 365). When the container 365 is initialized, the (updated) container image 340 is to be replicated from the container registry 310 or the container images 320. For example, the images data 342 of the container 365 are replicated or partially replicated from the container images data 322.

For example, the image pull scoring component 115 may compute an image locality score for replicating the container image 340 (e.g., one or more of the updated container images 340). The image pull scoring component 115 may then provide the locality scores to the image pull scheduler 325 to generate a list of files (e.g., a list of checksums or other index) of the container image files to be replicated. When a pod is started, not all images of a container needs be pulled, referred to as a partial pull. In a partial pull, portions of a remote image are replicated—this may require the image to be distributed in a format such as eStargz or zstd:chunked, which embed additional metadata (e.g., the metadata 324 or 344) for the retrieval of individual files. A partial pull aims at replicating the portion of images that contains files not already present in the local storage of the pod (e.g., new or changed files) in order to save time and resources from replicating existing or duplicate files.

According to aspects of the present disclosure, the image pull scoring component 115 computes the image locality scores at a granular level below the image level. For example, two similar images (e.g., as reflected by an image-level scoring heuristic) may be further distinguished by differences of individual files that are missing or different. Traditionally, the image pull scheduler (e.g., the scheduler 325) may deprioritize only the same images during replication (e.g., pulling images that are not the same and ignoring similarity on the file level). Using the techniques of the present disclosure, the scheduler may prioritize replications based on file-level differences or on more granular levels. For example, the scheduler may retrieve the metadata of an image either directly, or with an additional call into a node and the node's container runtime interface (CRI) runtime. Each layer in the image metadata may contain a list of files and a summary (e.g., a digest) of the list of the files. In cases of large files, the data may be splitted in chunks, each of which may be stored and retrieved individually.

An example computation of the image-pull score at a chunk or file level is presented below. Given a container image including two layers, the scheduler may merge all chunks of the image in a single list:

layer1:
path:/usr/bin/b2sum digest32ce8b1850f6f9706dbf516c3d13b07f13fea-qa94e6b6d6d6e 7cca3f8383494045 offset:0 size:53416
path:/usr/bin/base32 digest: 7 4cede3048e 144bea3805b43524efd6824ecaa259ac01679515ab-508bb6c99f0 offset:0 size:36936
layer2:
path:/big/file digest:e7 4b9318000f88d568942d26d1 d85ac4a37b9e27834b31 aff9532d6e81 bea865 offset:0 size: 1048576
path:/big/file digest: 5891 b5b522d5df086dOff0b11 0fbd9d21 bb4fc7163af34d08286a2e846f6be03 offset: 1048576 size:200

The scheduler merges the chunks in a single list (e.g., a continuous list):
path:/usr/bin/b2sum digest: 32ce8b1850f6f9706dbf516c3d13b07f13fea94e6-b6d6d6e7cca3f838349404 5 offset:0 size:53416
path:/usr/bin/base32 digest:? 4cede3048e 144bea3805b43524efd6824ecaa259ac01679515ab5-08bb6c99f0 offset:0 size:36936
path:/big/file digest:e 7 4b9318000f88d568942d26d1 d85ac4a37b9e27834b31 aff9532d6e81 bea865 offset:0 size: 1048576
path:/big/file digest: 5891 b5b522d5df086dOff0b11 0fbd9d21 bb4fc7163af34d08286a2e846f6be03 offset: 1048576 size:200

This merged list is sent to each node in a cluster to calculate a locality score. For example, an image pull scoring component of each node may calculate the score as below:

```
def score(local_shorage, chunks):
score=0
total_size=0
for chunk in chunks:
total_size+=chunk.size
if local_storage.has(chunk.digest):
score+=chunk.size
return score/total_size
```

The above computation allows each node to compute the locality score that reflects image similarities on the chunk-level. Unlike conventional scoring methods that have the scheduler retrieve a list of images and calculate image-level scores, each node here calculates the locality score for partial image pull. The node may then send the scoring results to the scheduler for image pull prioritization. This further saves transmission resources because sending the list of all known chunks in an image is often expensive. Therefore, the present disclosure provides at least two distinct improvements over the conventional method: (1) distributed image pull scoring computation at each node (as opposed to sending a list of images for central processing); and (2) the scoring results are at a granular level (e.g., chunks) while the list of chunks needs not be sent to the scheduler, only the scoring results on each node are sent to the scheduler. This way, granular distinctions are achieved without substantial resource consumption. As a result, different versions of the same container image need not perform replication on the unchanged files or chunks, as the scheduler now knows the similarity of the different versions.

During operation, the image pull scheduler 325 may update, when a container image is already present, container image data in a prioritized order based on the locality score. The updated container images 340 may have the container images data 342 updated by replacing or adding the chunks or files that are different or missing (e.g., in view of the container images and files 312 of the container registry 310). The image pull scheduler 325 thus permits the pod 360 to identify similarities with some files already present in the storage, even if the images are different. In some cases, changing a single byte in a layer of an image would cause the summary or digest to be different. Previous scoring would not detect any similarity while the scoring techniques herein capture the similarities and allows for comparison between supposedly different images that may include same files. Such granularity enables efficiency in replication operations.

Figure 4:
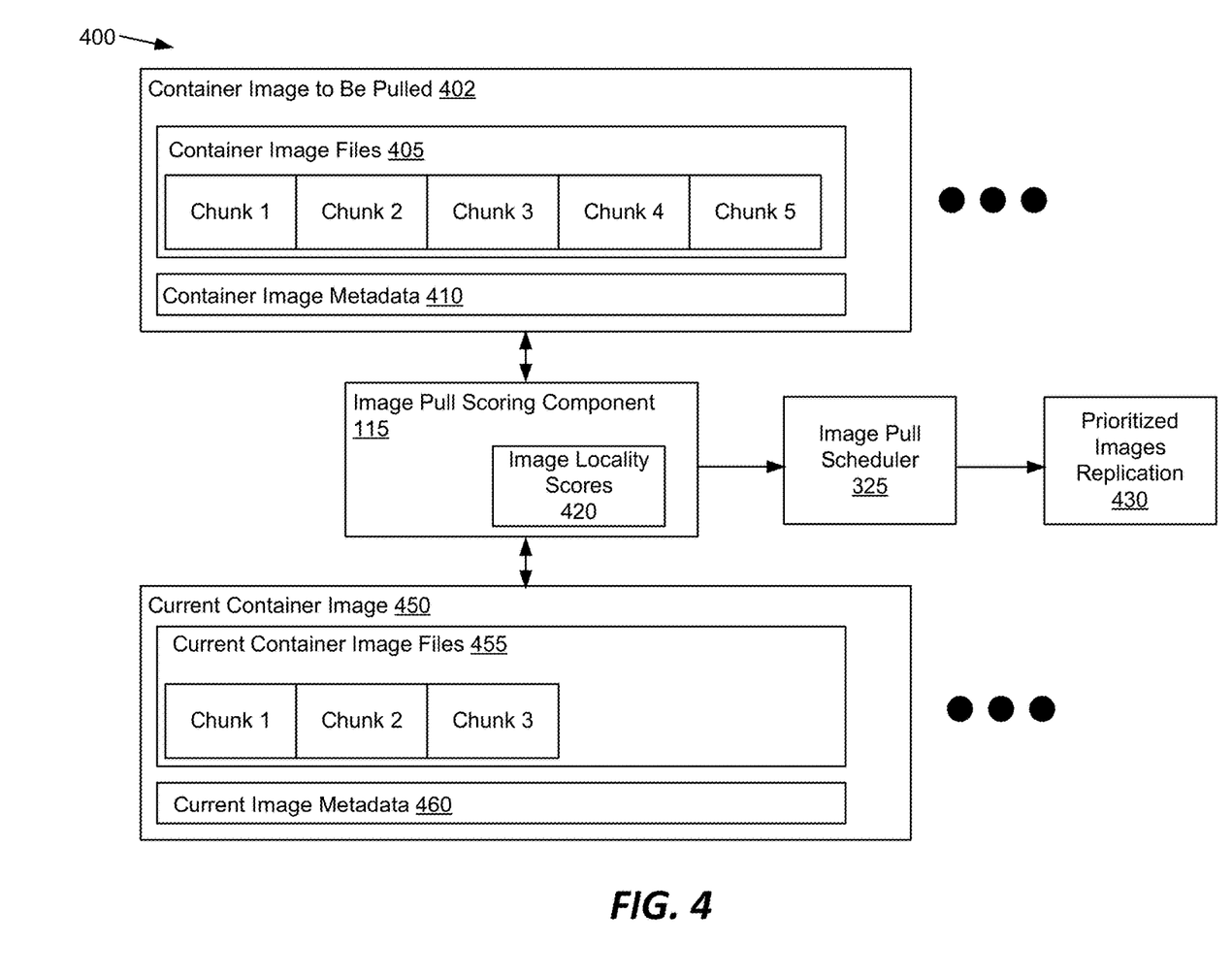
FIG. 4 depicts an example of a container image to be pulled from a container image registry based on chunk aware image locality scores, in accordance with some embodiments.

FIG. 4 depicts an example 400 of a container image 402 to be pulled from a container image registry based on chunk aware image locality scores, in accordance with some embodiments. As shown, the image pull scoring component 115 receives the container image metadata 410 from the container image 402 and the current image metadata 460 of the current container image 450. The respective metadata 410 and 460 may include summaries of the files or chunks information of the respective container image files 405 and 455. The image pull scoring component 115 computes an image locality score 420 for each node that may pull the container image 402 (including a node that includes the current container image 450). The image locality score 420 may be computed using the example above. The image pull scoring component 115 may send the image locality scores 420 of multiple nodes to the image pull scheduler 325. The image pull scheduler 325 may then prioritize the nodes based on the image locality scores 420 for images replication 430.

Figure 5:
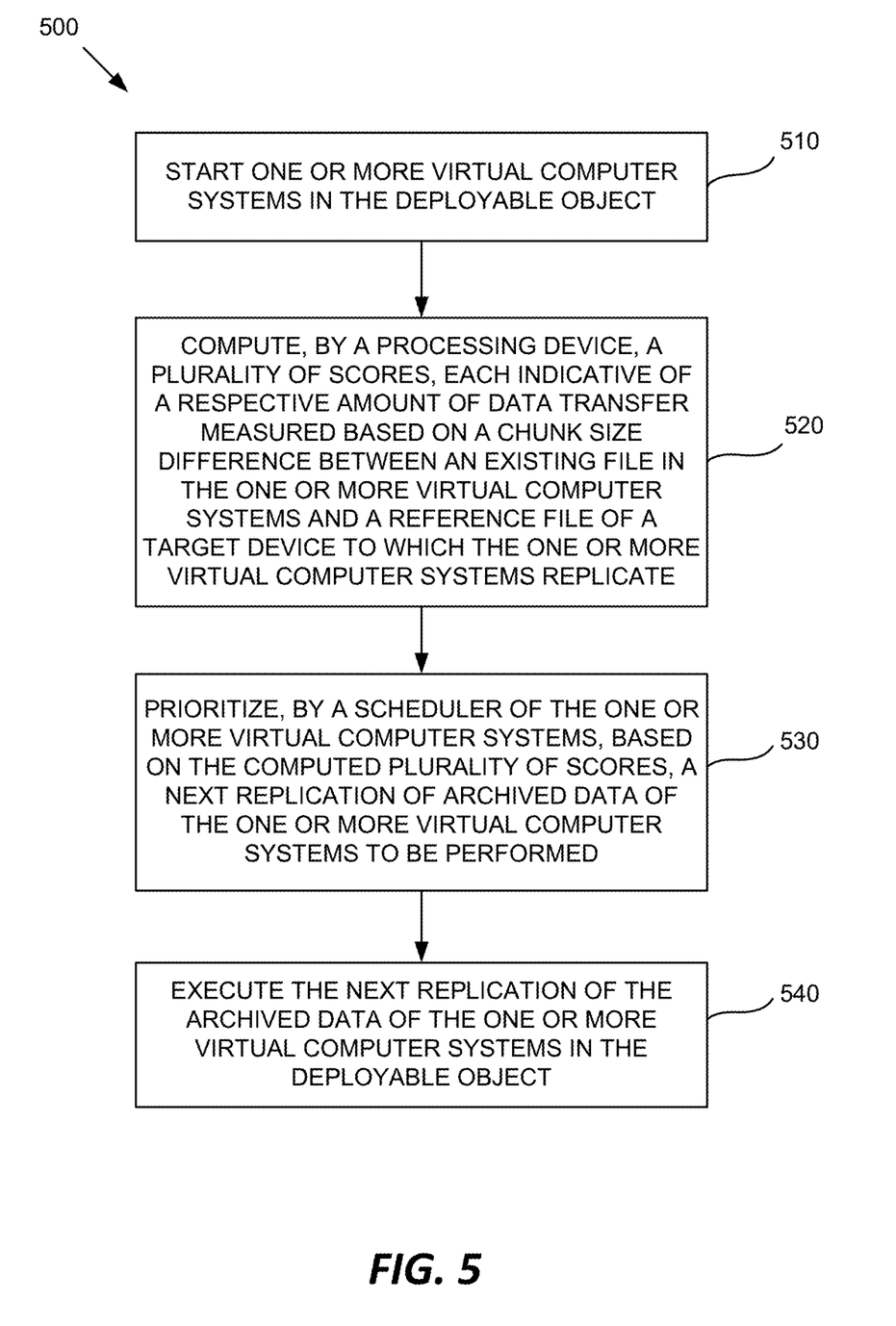
FIG. 5 is a flow diagram of a method of pulling container images based on locality scores with fine granularity, in accordance with some embodiments.

FIG. 5 is a flow diagram of a method 500 of computing locality scores of a container image pulled to a container registry, in accordance with some embodiments. Method 500 may be performed by processing logic or a processing device that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by image pull scoring component 115 of FIGS. 1, 3-4, and 6.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where a processing device starts one or more virtual computer systems in a deployable object, such as a pod. The pod may be in a Kubernetes network cluster. The one or more virtual computer systems may include virtual machines or containers, such as the container 136 of FIG. 1. That is, starting the one or more virtual systems in the deployable object may include initiating one or more containers in a pod running on a node of a cluster.

At block 520, the processing device computes image locality scores (e.g., for one or more nodes), each indicative of a respective amount of data transfer measured based on a chunk size difference between an existing file in the one or more virtual computer systems and a reference file of a target device to which the one or more virtual computer systems replicate. For example, the existing file is one in the container image to be pulled (e.g., from a registry). For example, the file may be a file in a container image to be pulled or replicated to the one or more virtual computer systems.

At block 530, a scheduler of the one or more virtual computer systems, based on the computed scores, prioritizes a subsequent replication (e.g., a next replication) of archived data (e.g., a container image) of the one or more virtual computer systems to be performed. For example, the computed scores provide the scheduler information to rank which container image pull may cause a longer duration than others in view of data volume, bandwidth, and relevant information. The prioritization may be based on rules set by users, such as latency, image type or category, among others. In some cases, the archived data includes at least one container image to be replicated in the one or more containers. The at least one container image may include binary data representing an application and software dependent thereon.

At block 540, the processing device executes the subsequent replication of the archived data of the one or more virtual computer systems in the deployable object. For example, the execution may include a partial pull if the target container already includes files or chunks of files of a container image to be replicated. In some cases, executing the subsequent replication of the archived data includes pulling the at least one container image for initiating the one or more containers in the pod.

Figure 6:
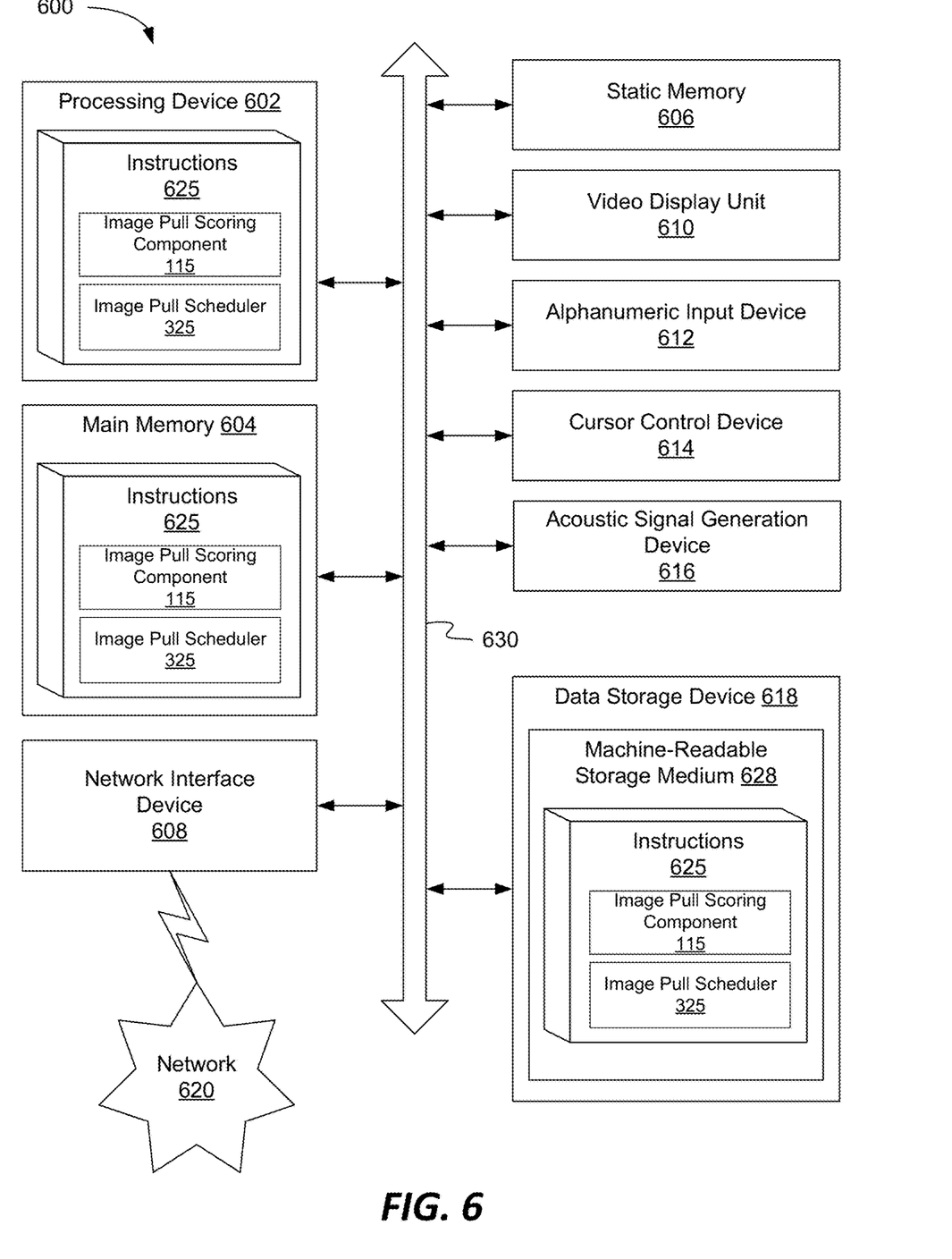
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM), or other non-transient machine readable memories), a static memory 606 (e.g., flash memory and a data storage device 618, or other non-transient machine readable memories), which may communicate with each other via a bus 630. The main memory 604 may store instructions 625 to be executed by the processing device 602.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein. For example, the processing device 602 may execute instructions 625, which includes instructions corresponding to the image pull scoring component 115 and the image pull scheduler 325.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for scoring image pull operations, e.g., including instructions corresponding to the image pull scoring component 115 and the image pull scheduler 325 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of managing replication in a deployable object, the method comprising:
   starting one or more virtual computer systems in the deployable object;
   computing, by a processing device, a plurality of scores, each indicative of a respective amount of data transfer measured based on a chunk size difference between an existing file in the one or more virtual computer systems and a reference file of a target device to which the one or more virtual computer systems replicate;
   prioritizing, by a scheduler of the one or more virtual computer systems, based on the computed plurality of scores, a subsequent replication of archived data of the one or more virtual computer systems to be performed; and
   executing the subsequent replication of the archived data of the one or more virtual computer systems in the deployable object.

2. The method of claim 1, wherein starting the one or more virtual computer systems in the deployable object comprises:
   initiating one or more containers in a pod running on a node of a cluster.

3. The method of claim 2, wherein the archived data comprises at least one container image to be replicated in the one or more containers, wherein the at least one container image comprises binary data representing an application and software dependent thereon.

4. The method of claim 3, wherein executing the subsequent replication of the archived data comprises pulling the at least one container image for initiating the one or more containers in the pod.

5. The method of claim 4, wherein the pod is running on a node of a Kubernetes cluster.

6. The method of claim 2, wherein computing the plurality of scores comprises:

computing, at the node of the cluster, the plurality of scores based on a chunk size corresponding to missing information in the one or more virtual computer systems, wherein the node of the cluster receives a list of chunks from the scheduler of the one or more virtual computer systems; and
   sending, from the node of the cluster, the plurality of scores to the scheduler of the one or more virtual computer systems for prioritizing the subsequent replication.

7. The method of claim 6, further comprising:
   retrieving, by the scheduler, metadata associated with the archived data, wherein the metadata comprises a plurality of layers, each including a list of files and associated information, wherein part of the list of files is split into two or more chunks;
   merging, by the scheduler, the plurality of layers of the metadata into a continuous list for the node of the cluster; and
   computing, at the node of the cluster, the plurality of scores based on the merged continuous list.

8. An apparatus for managing replication in a deployable object, the apparatus comprising:
   a memory; and
   a processing device operatively coupled to the memory, the processing device to:
   start one or more virtual computer systems in the deployable object;
   compute a plurality of scores, each indicative of a respective amount of data transfer measured based on a chunk size difference between an existing file in the one or more virtual computer systems and a reference file of a target device to which the one or more virtual computer systems replicate;
   prioritize, by a scheduler of the one or more virtual computer systems, based on the computed plurality of scores, a subsequent replication of archived data of the one or more virtual computer systems to be performed; and
   execute the subsequent replication of the archived data of the one or more virtual computer systems in the deployable object.

9. The apparatus of claim 8, wherein the processing device and the memory are to start the one or more virtual computer systems in the deployable object by:
   initiating one or more containers in a pod running on a node of a cluster.

10. The apparatus of claim 9, wherein the archived data comprises at least one container image to be replicated in the one or more containers, wherein the at least one container image comprises binary data representing an application and software dependent thereon.

11. The apparatus of claim 10, wherein the processing device and the memory are to execute the subsequent replication of the archived data by pulling the at least one container image for initiating the one or more containers in the pod.

12. The apparatus of claim 11, wherein the pod is running on a node of a Kubernetes cluster.

13. The apparatus of claim 9, wherein the processing device and the memory are to compute the plurality of scores by:
   computing, at the node of the cluster, the plurality of scores based on a chunk size corresponding to missing information in the one or more virtual computer systems, wherein the node of the cluster receives a list of chunks from the scheduler of the one or more virtual computer systems; and sending, from the node of the cluster, the plurality of scores to the scheduler of the one or more virtual computer systems for prioritizing the subsequent replication.

14. The apparatus of claim 13, wherein the processing device and the memory are further to:

retrieve, by the scheduler, metadata associated with the archived data, wherein the metadata comprises a plurality of layers, each including a list of files and associated information, wherein part of the list of files is split into two or more chunks;

merge, by the scheduler, the plurality of layers of the metadata into a continuous list for the node of the cluster; and compute, at the node of the cluster, the plurality of scores based on the merged continuous list.

15. A non-transitory computer-readable storage medium having instructions stored thereon that, when executed by a processing device for managing replication in a deployable object, cause the processing device to:

start one or more virtual computer systems in the deployable object;

compute, by the processing device, a plurality of scores, each indicative of a respective amount of data transfer measured based on a chunk size difference between an existing file in the one or more virtual computer systems and a reference file of a target device to which the one or more virtual computer systems replicate;

prioritize, by a scheduler of the one or more virtual computer systems, based on the computed plurality of scores, a subsequent replication of archived data of the one or more virtual computer systems to be performed; and execute the subsequent replication of the archived data of the one or more virtual computer systems in the deployable object.

16. The non-transitory computer-readable storage medium of claim 15, wherein to start the one or more virtual computer systems in the deployable object is to:

initiate one or more containers in a pod running on a node of a cluster.

17. The non-transitory computer-readable storage medium of claim 16, wherein the archived data comprises at least one container image to be replicated in the one or more containers, wherein the at least one container image comprises binary data representing an application and software dependent thereon.

18. The non-transitory computer-readable storage medium of claim 17, wherein to execute the subsequent replication of the archived data is to:

pull the at least one container image for initiating the one or more containers in the pod.

19. The non-transitory computer-readable storage medium of claim 18, wherein the pod is running on a node of a Kubernetes cluster.

20. The non-transitory computer-readable storage medium of claim 16, wherein to compute the plurality of scores is to:

compute, at the node of the cluster, the plurality of scores based on a chunk size corresponding to missing information in the one or more virtual computer systems, wherein the node of the cluster receives a list of chunks from the scheduler of the one or more virtual computer systems; and send, from the node of the cluster, the plurality of scores to the scheduler of the one or more virtual computer systems for prioritizing the subsequent replication.

* * * * *